United States Patent [19]

Sands

[11] Patent Number: 4,783,094
[45] Date of Patent: Nov. 8, 1988

[54] SAFETY DEVICE FOR HITCH PINS

[76] Inventor: John E. Sands, R.R. 1, Box 54, Delhi, Iowa 52223

[21] Appl. No.: 75,419

[22] Filed: Jul. 20, 1987

[51] Int. Cl.⁴ .............................................. B60D 1/02
[52] U.S. Cl. .................................... 280/515; 172/677; 280/507
[58] Field of Search ............... 280/515, 504, 507, 495, 280/511; 70/232; 172/677, 678, 679; 403/315, 316, 317

[56] References Cited

U.S. PATENT DOCUMENTS

| | | | |
|---|---|---|---|
| 2,654,613 | 10/1953 | Blair | 280/515 |
| 3,190,677 | 6/1965 | Robbins | 280/515 |
| 3,522,958 | 8/1970 | Lusignan | 280/511 |
| 3,794,357 | 2/1974 | Frye | 280/507 |
| 3,876,242 | 4/1975 | Eaton | 280/511 |
| 4,394,031 | 7/1983 | Barton | 280/507 |
| 4,552,377 | 11/1985 | Folkerts | 280/515 |
| 4,579,364 | 4/1986 | Kranz | 280/515 |
| 4,650,207 | 3/1987 | Ackermann | 280/507 |

Primary Examiner—John J. Love
Assistant Examiner—Everett G. Diederiks, Jr.
Attorney, Agent, or Firm—James C. Nemmers

[57] ABSTRACT

A safety device for maintaining in place a pin connecting the drawbar of a tractor to the tow bar or tongue of a towed piece of equipment. The safety device is mounted on the drawbar and is slideable along the drawbar. An arm extends outwardly from the device, and the device is moved so that the arm is over the top of the drawbar pin when the pin is in place thereby preventing it from becoming disengaged from the drawbar and tongue. A locking pin prevents the safety device from sliding along the drawbar so as to keep it in its pin retaining position.

4 Claims, 1 Drawing Sheet

SAFETY DEVICE FOR HITCH PINS

BACKGROUND OF THE INVENTION

The invention relates generally to devices for maintaining a hitch pin securely in place so that it does not become inadvertently disengaged from the connection.

Hitch pins that connect the tongue of a towed vehicle, such as a farm implement, to the drawbar of a tractor or other prime mover are well known and have been used for many, many years. The hitch pin is generally inserted through aligned openings in the drawbar and tongue, and the common hitch pin has a collar near its upper end that prevents it from falling through the aligned openings but which allows limited vertical movement. It is also common practice to insert a retaining pin or clip through an opening near the lower end of the pin. However, these retaining pins or clips can become easily dislodged as the implement is drawn through agricultural fields. The retaining pin or clip thus becomes lost, and if it is not replaced, the pin can become disengaged from the drawbar and tongue creating a safety hazard.

To overcome the problem, numerous modifications have been made to the standard, simple hitch pin in an effort to resolve the problem. None of these to date have been satisfactory because of cost, complexity, difficulty to use, etc.

Another approach to maintaining the hitch pin in place is to provide a device that will block the head of the pin thereby preventing it from being pulled upwardly out of the hitch connection. A number of these locking devices are known, and they generally utilize a moveable component that is moveable to one of two positions, a blocking position or an unblocking position. However, when the device of this type encounters a force during use, it frequently will move to the unblocking position and will stay in that position until corrected. Other devices of this type will remain in a locked position but are very complex and difficult to use. Devices of the blocking type are shown, for example, in U.S. Pat. Nos. 2,593,247, 2,697,618, 3,061,334, 3,190,677, 3,522,958, 3,679,243, 3,685,864, 3,794,357, 4,394,031, 4,552,377 and 4,579,364. Some of these patents show devices of the blocking type that are utilized as safety devices for a trailer hitch in which the arm extends over a ball and socket hitch to keep the two together.

There is therefore a need for an improved means of assuring that a hitch pin will stay in place under practically all conditions. Such a device must be relatively simple, easy to use, not excessively expensive and almost foolproof. The present invention is directed toward a device which achieves all of these goals.

SUMMARY OF THE INVENTION

The safety device of the invention has a hollow main body of a size and shape to permit it to be slipped onto the end of the drawbar of a tractor. On top of the main body, there is formed a support shaped like an inverted "U". Aligned openings are formed in the top of the support and in the main body so as to receive a locking pin, quite similar to the standard, common hitch pin. The main body of the device also has an arm that extends rearwardly along and over the drawbar. Since the drawbar normally has two openings in it, the device of the invention is slipped over the drawbar and moved forwardly out of the way so that the tongue of the implement to be towed can be connected to the drawbar in the usual manner with a simple hitch pin. After the connection has been made, the device of the invention is slid rearwardly until the second opening in the drawbar is directly beneath and aligned with the locking pin. The locking pin will then drop into the opening and prevent the safety device from moving until the locking pin is pulled upwardly and disengaged from the opening in the drawbar. In this position, the arm extending from the device extends over the top of the hitch pin making it impossible for the hitch pin to be withdrawn, either intentionally or accidentally.

DESCRIPTION OF THE PREFERRED EMBODIMENT OF THE INVENTION

As previously indicated, the device of the invention is intended for use in connection with a hitch pin connection in which a towed vehicle is connected to a prime mover, such as a tractor. Tractors commonly are provided with a drawbar 10, while the implement to be towed generally has a tongue which commonly has an upper arm 12 and a lower arm 14.

Figure 1:
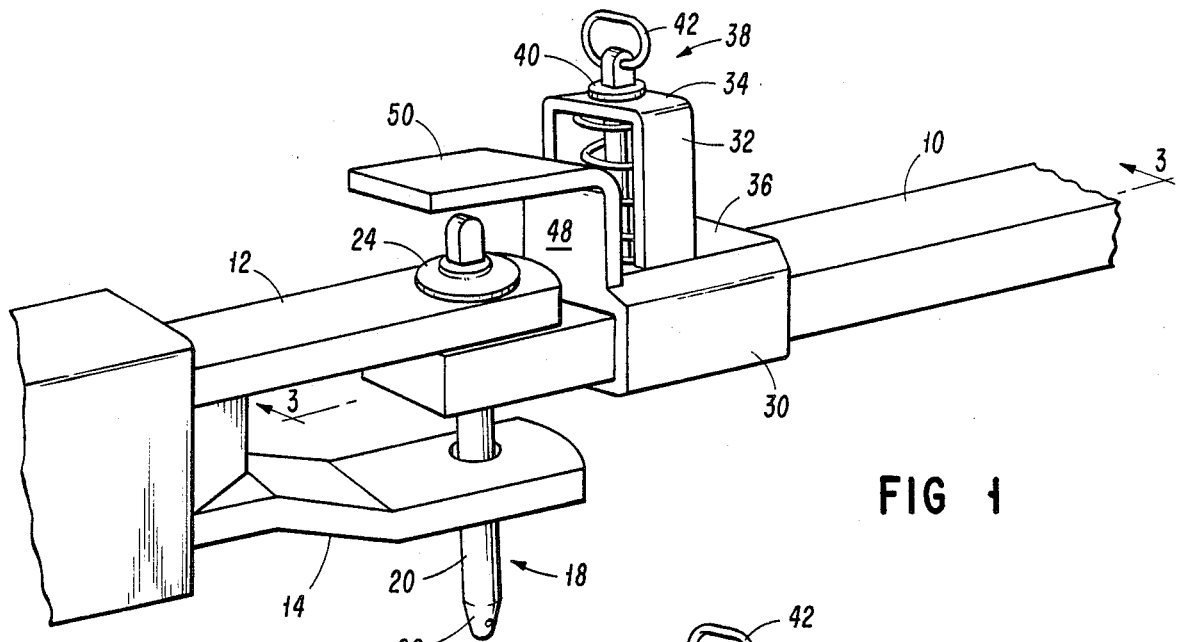
FIG. 1 is a perspective view showing the device of the invention in place in its blocking position over a hitch pin connecting a drawbar and tongue.

The drawbar 10 is always provided with an opening 16 near its rear end for receiving a hitch pin 18. Similarly, upper arm 12 and lower arm 14 have aligned openings for receiving the hitch pin 18, and when the openings in the upper and lower arms 12 and 14 are aligned with the opening 16 in the drawbar, the hitch pin can easily be inserted to make the connections. This is illustrated in FIG. 1 as well as FIG. 3.

The hitch pin 18 shown in the drawings is of the very common and simple type that consists of a main body 20 having a circular cross-sectional shape with a tapered lower end 22 and a collar 24 near its upper end.

The drawbar 10 may contain, in addition to the hitch pin opening 16, a second opening 26 located forwardly of opening 16. If the drawbar does not have such an opening, such an opening can easily be drilled in the drawbar to permit use of the device of the invention.

The safety device of the invention consists of a tubular main body 30 the interior dimensions of which are such that it will closely but easily fit over the drawbar 10. Permanently affixed to the main body 30 is an upwardly extending support 32 which is preferably an inverted U-shaped support that includes an upper member 34. Both the upper member 34 and the top 36 of the main body 30 contain openings which are vertically aligned so as to receive a locking pin indicated generally by the reference numeral 38. Pin 38 is very similar in design to hitch pin 18, except that it need not be as large since it will not be subjected to the same shearing forces as those to which the hitch pin 18 is subjected. The locking pin 38 has a collar 40 near its upper end, and a pull ring 42 is connected to the upper end above the collar 40. Preferably, the lower end of the pin 38 is tapered.

To bias the locking pin 38 downwardly into a locking position, a coil spring 44 is provided around the pin 38, the upper end of the spring engaging beneath the top 36 of the support 32 while the lower end of spring 44 engages a collar 46 formed near the lower end of pin 38. Thus, the pin 38 will be biased downwardly by the spring 44, and when the pull ring 42 is used to vertically raise the pin 38, the spring 44 will be compressed.

Figure 3:
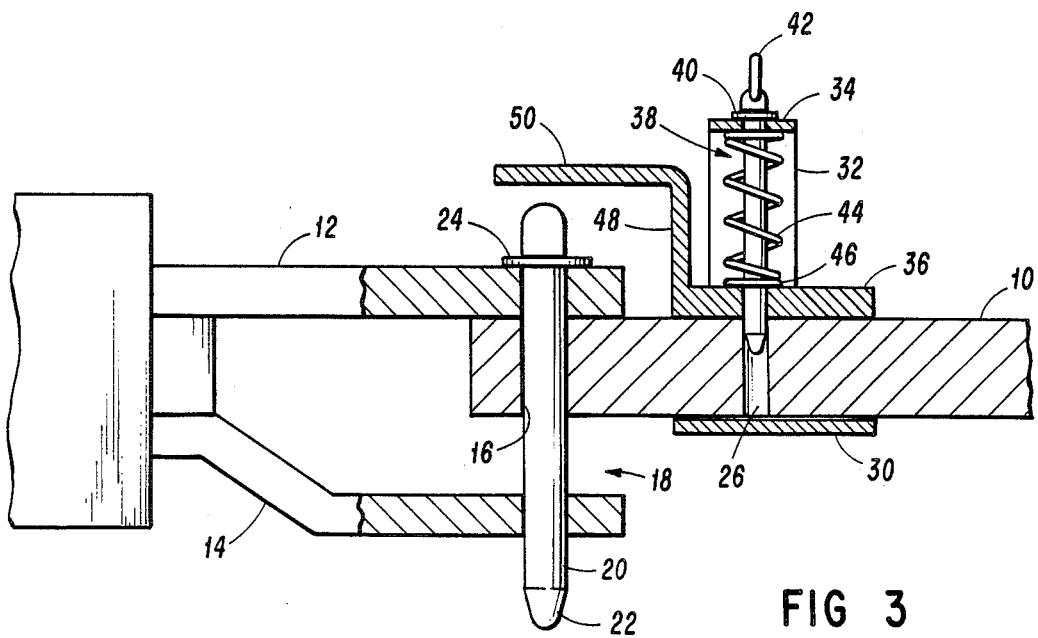
FIG. 3 is a sectional view taken on the line 3—3 of FIG. 1 and showing the safety device in a blocking position with the locking pin in place to prevent movement of the safety device.

Formed at the rear of the tubular main body 30 is a vertical member 48 at the upper end of which is the rearwardly extending safety arm 50. Safety arm 50 extends rearwardly a sufficient distance so that when locking pin 38 is engaged in opening 26, arm 50 will extend over the opening 16 in the drawbar 10. Also, the safety arm 50 is spaced above the drawbar 10 a sufficient amount to clear the upper end of the hitch pin 18, as best seen in FIGS. 1 and 3.

Figure 2:
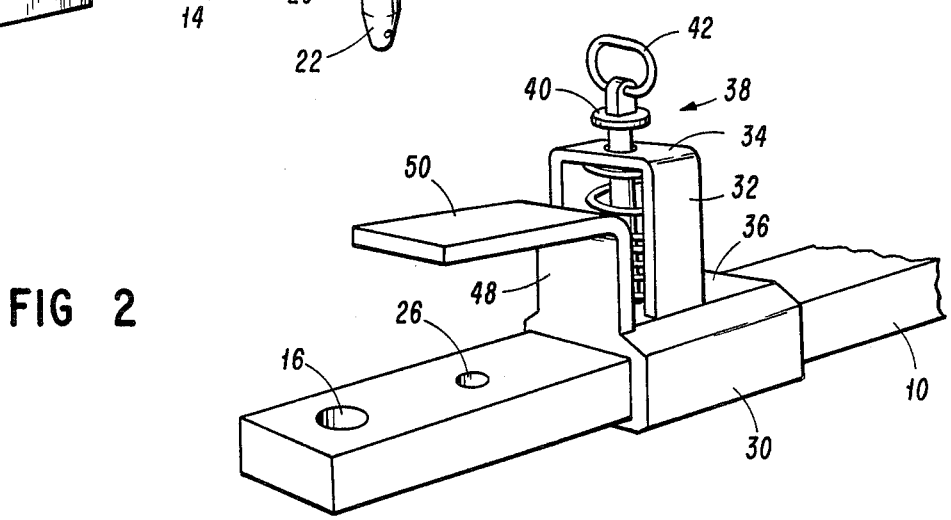
FIG. 2 is a perspective view of the device of the invention showing the device mounted on the drawbar and in a forward position permitting connection of an implement to the drawbar.

In use, the safety device of the invention functions as follows. The device is placed on the drawbar 10 by sliding it onto the drawbar 10 which will extend through the tubular main body 30. In order to slide the device onto the drawbar 10, the pull ring 42 will have to be grasped to raise the locking pin 38 so that its lower end clears the top surface of the drawbar 10. The safety device of the invention is then slid forwardly on the drawbar 10 a sufficient distance so that the safety arm 50 does not block the opening 16. FIG. 2 illustrates this position. The drawbar 10 is then positioned between the upper and lower arms 12 and 14 of the implement to be towed until the opening 16 in the drawbar 10 is in alignment with the openings in the upper and lower arms 12 and 14. This will then permit the hitch pin 18 to be inserted so as to complete the connection. When the hitch pin 18 is fully in place, the safety device of the invention is then moved rearwardly until the locking pin 38 drops into and engages the opening 26 in the drawbar 10. The force of the spring 44 will cause the locking pin 38 to drop into the opening 26 in drawbar 10 as the safety device is slid rearwardly and as soon as the opening 26 is directly beneath the lower end of the locking pin 38. In this position, which is shown in FIGS. 1 and 3, the safety arm 50 will extend over the top of the hitch pin 18 and prevent its removal. As best seen in FIGS. 1 and 2, it is virtually impossible for the hitch pin 18 to become disengaged from the connection. When the user, however, wishes to disconnect the towed equipment from the tractor, the pull ring 42 is raised and the safety device is slid forwardly along the drawbar 10 until the safety arm 50 no longer blocks the path of removal of the hitch pin 18. The hitch pin can then easily be removed in the usual manner.

From the foregoing description, it will be evident that the safety device of the invention is an accessory that will solve the problem of hitch pins becoming inadvertently disengaged. The device of the invention can be used with any hitch pin, and most importantly, it can be used with the standard inexpensive hitch pin which consists simply of a pin with a shoulder or collar near its upper end. Once the device of the invention is adapted and fitted to the drawbar of a tractor, it can be used to protect the connection of that tractor with any number of implements. Obviously, the dimensions of the device would be selected to fit the size of the drawbar of the tractor with which the device is to be used. Also, although the device of the invention is shown only in connection with the preferred embodiment thereof, it will be evident to those skilled in the art that various revisions and modifications can be made to the preferred embodiment without departing from the spirit and scope of the invention. It is my intention however that all such revisions and modifications as are obvious to those skilled in the art will be included within the scope of the following claims.

What is claimed is:

1. A safety device for use in connection with a towing vehicle having a rearwardly extending drawbar connected to the tongue of a towed vehicle by a hitch pin extending through aligned openings in the drawbar and tongue, said safety device comprising a tubular base member having a top wall and a bottom wall joined by side walls and adapted for slideable movement forwardly and rearwardly along a drawbar, the top wall having an opening extending through it, spaced-apart support members extending upwardly from the top wall of the base member and joined by an upper support member having an opening extending through it which opening is in vertical alignment with the opening in the top wall of the base member, a locking pin extending through and vertically moveable in the aligned openings in the top wall of the base member and the upper support member, means biasing said locking pin downwardly so that it normally extends through the opening in the top wall of the base member for locking engagement in an opening in a drawbar to lock the safety device in place on a drawbar, and a blocking arm extending outwardly from the safety device in a rearward direction when the device is mounted on a drawbar, said blocking arm being spaced upwardly from the top wall of the base member a sufficient distance so as to extend over the top of a hitch pin that is in place connecting the drawbar of a towing vehicle to the tongue of a towed vehicle.

2. The safety device of claim 1 in which the blocking arm extends upwardly and then rearwardly from the top wall of the base member.

3. The safety device of claim 1 in which the means biasing the locking pin downwardly includes a coil spring surrounding the locking pin, the locking pin having a collar near its lower end, and the coil spring engaging said collar and extending upwardly to engage the upper support member.

4. The safety device of claim 3 in which the blocking arm extends upwardly and outwardly from the top wall of the base member, and a pull ring is connected to the top of the locking pin to provide for manually raising the locking pin vertically.

* * * * *